March 11, 1952 E. M. ROSCHKE 2,588,413

RANDOM FREQUENCY DIVIDER

Filed June 11, 1948 2 SHEETS—SHEET 1

ERWIN M. ROSCHKE
*INVENTOR.*

BY Bruce L. Birchard

*HIS AGENT*

March 11, 1952 E. M. ROSCHKE 2,588,413

RANDOM FREQUENCY DIVIDER

Filed June 11, 1948 2 SHEETS—SHEET 2

ERWIN M. ROSCHKE
*INVENTOR.*

BY Bruce L. Birchard
*HIS AGENT*

Patented Mar. 11, 1952 2,588,413

UNITED STATES PATENT OFFICE 2,588,413

RANDOM FREQUENCY DIVIDER

Erwin M. Roschke, Broadview, Ill., assignor to Zenith Radio Corporation, a corporation of Illinois Application June 11, 1948, Serial No. 32,457

6 Claims. (Cl. 250—27)

This invention relates to frequency dividing circuits and more particularly to such circuits in which the repetition frequency of a train of pulses applied thereto is divided in a random manner and a train of pulses of lower repetition frequency is derived therefrom.

In radio wire transmission systems, such as those disclosed in application Number 773,848 of the present inventor, entitled Image Transmission System, filed September 13, 1947, and assigned to the present assignee, a key signal for decoding a coded radiated television signal is transmitted to subscriber receiving systems over wire line conductors. It is preferable in such systems that the actuation of the coding circuit for coding the radiated signal and the initiation of the oscillator generating the key signal take place at random intervals to prevent unauthorized interception and reproduction of the coded signal. However, it is necessary for proper synchronization of the subscriber receiver with the transmitter in such systems, that these random intervals be initiated at the time of occurrence of selected ones of the television synchronizing pulses.

Although not limited thereto, the present invention is especially suited for the above described type of system for actuating the coding circuit and the key signal oscillator at random intervals, which intervals are initiated at the time of occurrence of selected ones of the television synchronizing pulses, and which selection is effected in an entirely random manner.

It is an object of this invention to provide a frequency dividing circuit, especially suited for use in the above described type of system, in which the television synchronizing pulses are frequency divided in a random manner to obtain pulses for initiating the above mentioned circuits, the obtained pulses being in phase with respective randomly selected ones of the television synchronizing pulses.

A more general object of this invention is to provide a frequency dividing circuit in which the repetition frequency of a train of electrical pulses is divided in a random manner to produce a train of pulses of lower repetition frequency, the pulses in the lower frequency train being in phase with respective randomly selected pulses in the higher frequency train.

Another object of this invention is to provide means in such a frequency dividing circuit whereby the random frequency division may be controlled to take place within certain predetermined limits.

The features of this invention, which are believed to be new, are set forth with particularity in the appended claims. The invention itself, however, together with further objects and advantages thereof, may best be understood by reference to the following description when taken in conjunction with the accompanying drawings, in which:

Figure 1:
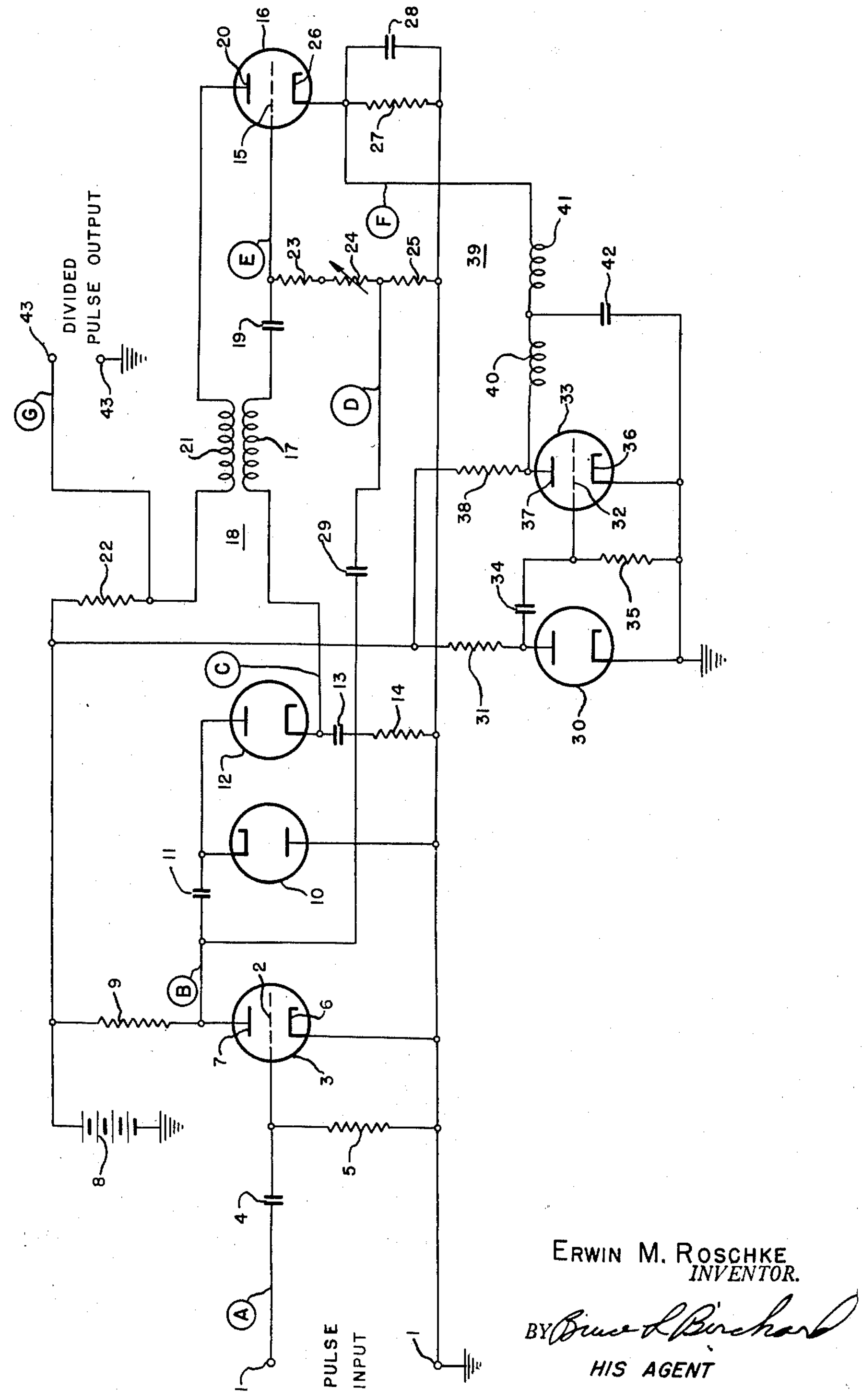
Figure 1 shows an embodiment of the proposed frequency divider circuit.

Referring now to Figure 1, the frequency divider circuit illustrated therein has a pair of input terminals 1. One of these terminals is connected to ground and the other is coupled to the control electrode 2 of discharge device 3 through coupling capacitor 4, control electrode 2 being connected to ground through grid leak resistor 5. The cathode 6 of device 3 is connected directly to ground, and the anode 7 of this device is connected to the positive terminal of a source of unidirectional potential 8 through load resistor 9, the negative terminal of this source being connected to ground.

Anode 7 of device 3 is coupled to the cathode of a unilaterally conducting device 10 through capacitor 11, this cathode being directly connected to the anode of a further unilaterally conducting device 12. The anode of device 10 is connected directly to ground, and the cathode of device 12 is coupled to ground through a series combination of capacitor 13 and resistor 14.

The cathode of unilaterally conducting device 12 is coupled to the control electrode 15 of electron discharge device 16 through the secondary winding 17 of a transformer 18 and a series connected capacitor 19. Device 16 is connected as a conventional blocking oscillator, the anode 20 of this device being coupled to the positive terminal of source 8 through the primary winding 21 of transformer 18 and a series connected load resistor 22. Control electrode 15 is connected to ground through a series combination of resistor 23, variable resistor 24 and resistor 25. Cathode 26 of device 16 is coupled to ground through a parallel combination of resistor 27 and capacitor 28. The anode 7 of discharge device 3 is further coupled to the common junction of resistors 24 and 25 through a capacitor 29.

A gaseous discharge device 30 has its anode connected to the positive terminal of source 8 through a resistor 31, and its cathode connected to ground. The anode of device 30 is coupled to the control electrode 32 of amplifier discharge device 33 through coupling capacitor 34, control electrode 32 being connected to ground through grid leak resistor 35. The cathode 36 of device 33 is connected to ground, and the anode 37 of this device is connected to unidirectional source 8 through resistor 38. The anode 37 is coupled to the cathode 26 of device 16 through a low pass filter 39. Filter 39 may comprise the usual series connected inductance coils 40 and 41 having their common junction coupled to ground through capacitor 42. Filter 39 is so adjusted that it passes noise signal frequencies from device 30 up to substantially 200 C. P. S.

The pulse output from the frequency divider circuit is derived across terminals 43 connected to one end of resistor 22 and to ground.

Figure 2:
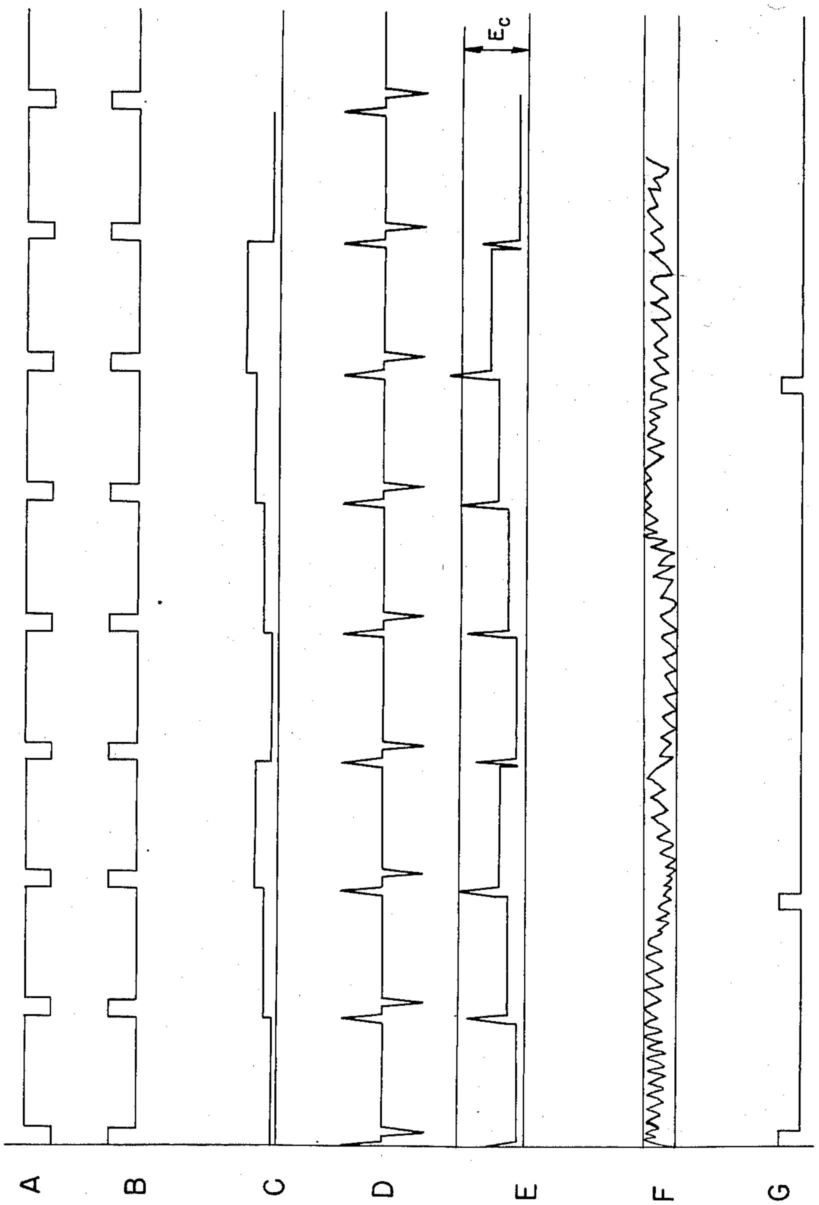
Figure 2 shows various curves useful in the understanding of the circuit of Figure 1.

The operation of the circuit of Figure 1 may best be understood by reference to the various curves shown in Figure 2. Figure 2A shows a train of negative going pulses applied to terminals 1 and having a certain recurrence frequency. These pulses are inverted in device 3 and appear at the anode 7 of this device as positive going pulses shown in Figure 2B. The positive going pulses appearing at anode 7 are utilized to charge capacitors 11 and 13, capacitor 13 being charged thereby through device 12. After each pulse, capacitor 11 rapidly discharges through device 10, the capacitor 13 retains its charge due to the unilateral characteristics of device 12. The charge on capacitor 13, therefore, builds up in steps, which action continues until the blocking oscillator circuit of device 16 is triggered thereby, and capacitor 13 thus discharges through a path including the control electrode 15 and cathode 26 of device 16. This action is shown in Figure 2C.

It is desirable that the blocking oscillator be triggered by the leading edge of such potential steps so that the output pulses are in phase with corresponding input pulses. To assure that the blocking oscillator is not tripped by any portion of the individual potential steps except by the leading edge, the positive going pulses appearing at the anode 7 of device 3 are impressed across resistor 25 in a differentiated condition, the time characteristics of capacitor 29 and resistor 25 being such that these pulses are differentiated and take the form shown in Figure 2D.

The triggering signal applied to the control electrode 15 of device 16 is the combination of the potential steps of Figure 2C and the positive peaks of the differentiated pulses of Figure 2D, and this triggering signal, hence, has a wave form as shown in Figure 2E, the positive peaks of the differentiated pulses being superimposed on the leading edge of each step of potential.

Gaseous discharge device 30 generates a noise signal having random amplitude characteristics, this signal being amplified in device 33 and passed through low pass filter 39 to the cathode 26 of device 16.

By adjusting the value of resistor 24, the critical bias level of control electrode 15 for triggering the blocking oscillator may be varied. This critical bias level is shown as Ec in Figure 2E, and potential peaks higher than this critical level trigger the blocking oscillator circuit. In the absence of the random noise signal across cathode resistor 27 of device 16, the blocking oscillator may be adjusted to trip due to the positive peaks of the differentiated pulses appearing, for example, on every fourth potential step in Figure 2E, and frequency division of four to one may be derived at terminals 43. However, due to the presence of the noise signal across cathode resistor 27, the bias of device 16 is changed in a random manner, and the blocking oscillator may be triggered, for example, by the positive peaks of the differentiated pulses appearing on the second or third potential steps in Figure 2E, and randomly divided pulses are derived at terminals 43, as shown in Figure 2G.

The amplitude of the noise signal is made small compared to the amplitude of the positive peaks of the differentiated pulses so that the blocking oscillator is triggered solely by these positive peaks, and correct phasing of the divided pulses with respect to the randomly selected one of the undivided pulses is maintained.

It is apparent that the limits between which said random frequency division occurs may be adjusted by varying the value of resistor 24 which in turn varies the level of Ec in Figure 2E.

The present circuit, therefore, provides at terminals 43, a pulse train in which the frequency of recurrence of the pulse is a random division of the frequency of recurrence of the pulses applied to terminals 1. However, regardless of the frequency division, the pulses derived from terminals 43 are always in phase with respective randomly selected pulses applied to terminals 1.

Although a particular form of noise signal generator has been shown, any known type of random signal generator may be used. Furthermore, although electron discharge device 16 is shown connected as a blocking oscillator, similar types of oscillators such as multivibrators and the like may replace the present blocking oscillator.

Therefore, while a certain specific embodiment of the invention has been shown and described, it is apparent that modifications may be made without departing therefrom. The appended claims are intended to cover any such modifications as fall within the true spirit and scope of the invention.

I claim:

1. A system for effecting random frequency division of a received periodic signal having a certain repetition frequency including: a storage circuit for developing an increment of potential in response to each cycle of said received signal; a random-signal generator; a controlled signal generator for producing an output signal in response to an applied control potential of a preselected magnitude large compared to said individual potential increments; and means for cumulatively applying the potential developed in said storage circuit and the output signal of said random generator as a control potential to said controlled generator.

2. A system for effecting random frequency division of a received periodic signal having a certain repetition frequency including: a storage circuit for developing an increment of potential in response to each cycle of said received signal; a controlled generator including a trigger circuit for producing an output signal in response to an applied signal exceeding a threshold value large compared with said potential increments; a random-signal generator coupled to said trigger circuit for applying a random signal thereto; and means for applying the potential developed in said storage circuit to said trigger circuit to trigger said controlled generator at random intervals determined conjointly by said developed potential and said random signal.

3. A system for effecting random frequency division of a received periodic signal having a certain repetition frequency including: a storage circuit for developing an increment of potential in response to each cycle of said received signal; a controlled generator including a trigger circuit for producing an output signal in response to an applied signal exceeding a threshold value large compared with said potential increments; a random-signal generator coupled to said trigger circuit for applying a random signal thereto; and means for coupling said storage circuit to said trigger circuit to trigger said controlled generator and discharge said storage circuit at random intervals determined conjointly by the potential developed in said storage circuit and said random signal.

4. A system for effecting random frequency division of received periodic pulses having a certain repetition frequency including: a storage circuit for developing an increment of potential in response to each of said received pulses; a controlled generator including a trigger circuit for producing output pulses in response to an applied signal exceeding a threshold value large compared with said potential increments; a random-signal generator coupled to said trigger circuit for applying a random signal thereto; and means for coupling said storage circuit to said trigger circuit to trigger said controlled generator and discharge said storage circuit at random intervals determined conjointly by the potential developed in said storage circuit and said random signal.

5. A system for effecting random frequency division of received periodic pulses having a certain repetition frequency including: a storage circuit for developing an increment of potential in response to each of said received pulses; a controlled generator including a trigger circuit for producing output pulses in response to an applied signal exceeding a threshold large compared with said potential increments; a random-noise generator coupled to said trigger circuit for applying a random noise signal thereto; a differentiating circuit for receiving said periodic pulses and coupled to said trigger circuit for applying differentiated received pulses thereto; and means for coupling said storage circuit to said trigger circuit to trigger said controlled generator and discharge said storage circuit at random intervals determined conjointly by the potential developed in said storage circuit and said random noise signal.

6. A system for effecting random frequency division of received periodic pulses having a certain repetition frequency including: a storage circuit for developing an increment of potential in response to each of said received pulses; a blocking-oscillator circuit coupled to said storage circuit for producing output pulses in response to an applied signal exceeding a threshold large compared with said potential increments and to discharge said storage circuit during each operating cycle of said oscillator; a random-noise generator coupled to said blocking oscillator for applying a random noise signal thereto; and a differentiating circuit for receiving said periodic pulses and coupled to said blocking oscillator for applying differentiated received pulses thereto superposed on said potential increments to trigger said blocking oscillator at random intervals determined conjointly by the potential developed in said storage circuit and said random noise signal.

ERWIN M. ROSCHKE.

REFERENCES CITED

The following references are of record in the file of this patent:

UNITED STATES PATENTS

| Number | Name | Date |
|---|---|---|
| 2,253,975 | Guanella | Aug. 26, 1941 |
| 2,411,648 | Brauer | Nov. 26, 1946 |
| 2,450,360 | Schoenfeld | Sept. 28, 1948 |
| 2,462,265 | Hirsch | Feb. 22, 1949 |
| 2,468,058 | Grieg | Apr. 26, 1949 |